United States Patent [19]

Takahashi

[11] 4,252,544

[45] Feb. 24, 1981

[54] ALUMINA ABRASIVE GRAINS AND METHOD FOR MANUFACTURING THE SAME

[75] Inventor: Tokiji Takahashi, Shiojiri, Japan

[73] Assignee: Showa Denko Kabushiki Kaisha, Tokyo, Japan

[21] Appl. No.: 37,431

[22] Filed: May 9, 1979

[30] Foreign Application Priority Data

Aug. 3, 1978 [JP] Japan .................................. 53-94121

[51] Int. Cl.$^3$ ................................................ C09C 1/68
[52] U.S. Cl. ........................................ 51/309; 264/67; 106/65
[58] Field of Search ................... 51/309; 264/67, 148

[56] References Cited

U.S. PATENT DOCUMENTS

| 2,635,950 | 4/1953 | Robinson | 264/148 |
| 3,491,492 | 1/1970 | Ueltz | 51/309 |
| 3,637,360 | 1/1972 | Ueltz et al. | 51/309 |

Primary Examiner—Donald J. Arnold
Assistant Examiner—W. Thompson
Attorney, Agent, or Firm—Kane, Dalsimer, Kane, Sullivan and Kurucz

[57] ABSTRACT

Alumina abrasive grains having a density of more than 3.75 g/cm$^3$ and a hardness (Knoop) higher than 1,900 Kg/mm$^2$ are disclosed as useful in manufacturing a grinding wheel with which sharp grinding is carried out under heavy loads. The grains are characterized in that the grain structure thereof is constructed of electrofused or high temperature calcined alumina coarse crystal particles and alumina fine crystal particles which are located between said alumina coarse crystal particles, the latter having particle sizes smaller than that of the former and being processed at a calcination temperature lower than that of the former, wherein said fine crystal particles are sintered integrally with said coarse crystal particles. The method of making the grains is also disclosed.

8 Claims, 1 Drawing Figure

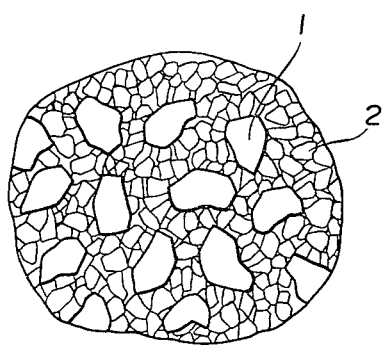

ALUMINA ABRASIVE GRAINS AND METHOD FOR MANUFACTURING THE SAME

BACKGROUND OF THE INVENTION

1. Field of the Invention

The present invention relates to alumina abrasive grains and more particularly to abrasive grains used for grinding operations.

2. Brief Description of the Prior Art

There are a variety of grinding operations under loads ranging from heavy grinding to extremely heavy grinding. For instance, stock removal and conditioning of steel ingot or slab, deburring or cutting-off of burs and runners of steel casting or the like are heavy grinding operations. Usually special abrasive grains are employed for the aforesaid heavy grinding operations.

Hitherto, typical abrasive grains for the heavy grinding operations as described above are those that are manufactured by sintering bauxite grain (c.f. Japanese Patent Publn. No. 4398/64, No. 27612/64 etc.). It is pointed out that as drawbacks of the hitherto known abrasive grains, that they have a reduced hardness due to inclusion of large quantities of foreign material other than alumina, such as silica, iron oxide and the like and that they may be employed only in a limited scope of application such as for the grinding of metallic materials composed mainly of stainless steel. This is because of the existence of a solid solution structure such as a glass-like structure or the like associated with these grains, causing them to be undesirable for the grinding of high hardness materials such as cast iron, chrome steel, spring steel and the like.

Usually high hardness metal materials such as special steel and the like are ground under a heavy pressure. In order to carry out such extremely heavy grinding operations, abrasive grains are available, which are manufactured by mixing alumina and zirconia powder, electrofusing them and then quenching them. However, this type of abrasive grains also has drawbacks in that the grains are very costly to manufacture. Generally speaking, the process of manufacturing fused type abrasive grains involves additional steps of crushing and sieving after completion of solidification of the molten material, during which a variety of grains sizes of abrasive grains are generated. It would be preferable, if all abrasive grains ranging from fine to coarse sizes could be used in many fields of application. However, the alumina-zirconia abrasive grains of coarse size only, are useful for heavy or extremely heavy load operations. Abrasive grains having grains sizes finer than that useful for the aforesiad heavy or extremely heavy load (pressure) operations cannot be used and are subjected to remelting. The problem is that the unusable portion occupies a considerably high percentage of the whole of the manufactured abrasive grains, which causes an increased manufacturing cost. Moreover, there is another problem with the latter composite abrasive grains, because of anticipated difficulty in securing a supply source of high purity zirconia. Accordingly it is expected that alumina-zirconia abrasive grains will become even more expensive. In view of the aforesaid problems with the currently available abrasive grains, development of other, replacement abrasive grains, has been looked for.

It goes without saying that good abrasive grains are identified by "sharp cutting with less wearing". To ensure the high performance capability of abrasive grains, it is necessary that the hardness of the abrasive grains be relatively higher than that of the workpiece to be ground. Under that condition, wearing of the abrasive grains is substantially reduced. Further and particularly in the case of grinding operations under heavy pressures, the abrasive grains require a high bending strength and compressive strength under the heavy load. Also, sharp cutting not only requires that the abrasive grains have high hardness and strength but also that they have a capability of generating a cutting edge so that new cutting edges are successively provided during the grinding operation. This is one of the most important properties for the abrasive grains. To ensure the generation of new cutting edges, it is necessary that chipping take place on the abrasive grains, at the extreme end portion thereof in contact with the workpiece. Chipping should occur to the most effective extent, in respect to quantity of material removal and the time interval or frequency of chipping. Of course this chipping occurs in a different manner, depending on a number of operating conditions such as applicable load etc. If no chipping takes place during the grinding operation, hot sticking or the like occurs on the workpiece because no new cutting edge is generated after the old cutting edge has been worn away. This eventually leads to stoppage of the grinding operation. On the other hand, excessive chipping is not desirable, because the abrasive grains wear too rapidly. Hence it is most preferable that chipping occur at the extreme end of the abrasive grain, to the minimum extent required for generation of new cutting edges at adequate time intervals during the grinding operation.

We have found that the fundamental physical properties of sintered abrasive grains depend on the density thereof, crystal particle size, and distribution of the crystal particles. The density is related to mechanical strength of the abrasive grain. As density increases the strength and hardness of the grain are correspondingly increased. Further the particle size of the crystal has an effect on the mechanical strength as well as on the extent of wearing of the abrasive grain. Abrasive grains having a small and compact crystal structure exhibit increased strength and resistance against wearing. In view of these facts, it is important to inhibit the growth of crystal particles and increase density of the grains during sintering.

The distribution of crystal particles in the abrasive grain is also related to the above described generation of a cutting edge, which is one of the important properties of the abrasive grains.

For instance, there are various kinds of sintered alumina abrasive grains which are manufactured by molding fine alumina powder and sintering the molded material at a variety of temperatures. In order to increase the density after completion of sintering, very finely crushed alumina is preferably used and further a small amount of inhibitor such as $Cr_2O_3$, $MgO$, $NiO$ or the like is added thereto so as to inhibit crystal growth, without any substantial increase in the sintering temperature. It is recognized as a drawback with this type of sintered alumina abrasive grains, that they may be employed only in a limited scope of applications because of their possessing less capability of generating of cutting edges due to their inherent structure. This is in spite of the fact that they are wholly composed of a uniform and fine sintered structure and meet satisfactorily the requirements for density and hardness after the completion of sintering. In order that the generation of cutting edges takes place with such abrasive grains, grinding under excessively heavy load conditions is necessary. Without excessive pressure (300 to 1,000 Kg of grinding wheel pressing load) chipping doesn't take place with this type of sintered alumina abrasive grain. This necessitates that the grinding wheel made of the sintered alumina abrasive grains be subjected to frequent dressing with the aid of a diamond tool or the like during the grinding operation. This results in decreased efficiency and increased wearing of the grinding wheel.

Moreover, among the known sintered alumina abrasive grains, there are those which are manufactured by the steps of mixing electrofused fine alumina powder with fine bauxite powder, molding the well mixed material and sintering the molded material. It is pointed out that with this latter type of abrasive grain, they have no problem in generating a cutting edge. However, they have a drawback in that the sintered bauxite portion located between the electrofused alumina grains has a low hardness, causing increased wear of the abrasive grain.

Working conditions in grinding operations under heavy loads are different, respectively, depending on the type and shape of workpiece to be ground, purpose of the grinding operation and grinding machine characteristics. Since there is a definite distinction between heavy grinding and extremely heavy grinding operations, it is necessary to provide abrasive grains which satisfactorily meet the requirements for the respective working conditions.

SUMMARY OF THE INVENTION

It is a principal object of the present invention to provide alumina abrasive grains for use in grinding under heavy loads and with which sharp grinding is ensured even under very severe working conditions.

It is another object of the invention to provide abrasive grains for a grinding wheel which will require less dressing during operation.

It is another object of the invention to provide abrasive grains which are made of inexpensive materials, with which there is no fear of maintaining the material supply source, as is the case with zirconia.

It is still another object of the invention to provide an economical and useful method for manufacturing the abrasive grains as described above.

To attain the aforesaid objects to perfect satisfaction, alumina abrasive grains having a density of more than 3.75 g/cm$^3$, preferably 3.80 g/cm$^3$ and a hardness (Knoop) higher than 1,900 Kg/mm$^2$, preferably 2,000 Kg/mm$^2$, useful for grinding operations under heavy loads, are provided in accordance with the present invention, which is characterized in that the grain structure thereof is constructed of electrofused or high temperature calcined alumina coarse crystal particles and alumina fine crystal particles which are interposed between said alumina coarse particles, the latter having a particle size smaller than that of the former and being processed at a calcination temperature lower than that of the former, wherein said fine crystal particles are sintered integrally with said coarse crystal particles.

In a preferred embodiment of the invention the electrofused or high temperature calcined alumina coarse crystal particles have particle sizes in the range of 3 to 10 μm, while the alumina fine crystal particles have particles sizes smaller than 2 μm and a hardness (Knoop) higher than 2,000 Kg/mm$^2$.

Further a method in accordance with the present invention for manufacturing the alumina abrasive grains, comprises; well kneading electrofused or high temperature calcined coarse alumina powder having particle sizes in the range of 3 to 10 μm and fine alumina powder having particle sizes smaller than 1 μm in the presence of water or if required, primary binder; extruding the kneaded material by means of an extruder; drying the extruded material, while cutting it to a predetermined length; and sintering the cut and dried pieces of the extruded material.

Preferably the aforesaid step of extruding is carried out in such a manner as to extrude the kneaded material through a small nozzle in a vacuum aided type extruder, of which the inner diameter is substantially equal to the outer diameter of the required abrasive grain, said extruder being adapted to operate at reduced pressure with air evacuated. As a result the extruded material is naturally cut off in pieces in the course of falling down from the extruder or during the drying operation. The length of which is almost equal to or a little longer than the diameter of the desired grains.

The aforesaid step of sintering may be carried out in a rotary kiln at a temperature of 1550° to 1650° C.; preferably 1580° to 1620° C. for a time period of 40 to 60 minutes.

BRIEF DESCRIPTION OF THE DRAWING

The single accompanying FIGURE is a microscopic view of an abrasive grain embodiment in accordance with the present invention.

DETAILED DESCRIPTION OF THE PREFERRED EMBODIMENTS OF THE INVENTION

Now the abrasive grains of the invention will be described in detail with reference to the accompanying drawing illustrating the microstructure of the embodiment abrasive grain. In the FIGURE, which is a schematic sketch of a section of the abrasive grain, the reference numeral 1 denotes electrofused or high temperature calcined alumina coarse crystal particles and the reference numeral 2 denotes alumina fine crystal particles in a sintered state.

Preferably the electrofused or high temperature calcined alumina crystal particles have a particle size in the range of 3 to 10 μm. Too small a sized crystal particle creates a problem of reduced generation of cutting edge of the abrasive grain, due to the tight and uniform structure generated. On the other hand, however, too large a sized crystal particle brings about accelerated wearing. The electrofused alumina particles normally are similar to white or brown fused alumina, whereas the high temperature calcined alumina represents alumina which is processed at an elevated temperature of higher than 1,700° C., preferably higher than 1,800° C. For instance, the latter is manufactured by way of the steps of molding alumina fine powder, calcining the molded material at said high temperature and then crushing the calcined material. When observing microscopically the electrofused or high temperaure calcined alumina, usually remarkably high crystal growth is recognized therewith, having a crystal size in the range of several tens to several hundreds of a micron. Thus when crushing the calcined alumina, a crushed type single crystal particle is obtained. When alumina is calcined at a lower temperature of approximately 1,500° C., it is recognized that each particle of the crushed alumina is formed of an aggregation of fine crystal particles, even when crushing it to a particle size of 3 to 10 μm, resulting in lower gravity and reduced grinding capability of the product abrasive grain.

The abrasive grain is constructed so that in the space intermediate of the alumina coarse crystal particles, the alumina fine crystal particles are self-sintered one to another and moreover are sintered integrally with said alumina coarse crystal particles so that a dense and tight structure is obtained therebetween. Preferably said alumina fine crystal particles are smaller than the alumina coarse crystal particles and more particularly smaller than 2 μm. In this connection it is to be noted that a small amount of crystal growth inhibitor such as MgO or the like may be added so as to inhibit the crystal growth of the alumina fine crystal particles.

The calcined alumina fine crystal particles are required to be processed at a temperature lower than that of said alumina coarse crystal particles. The fact that the calcined portion of the fine crystal particles is subjected to processing at a lower temperature means that both the step of producing alumina fine crystal particles and the step of sintering the fine crystal particles in the production of abrasive grain are performed at a temperature lower than the calcining temperature of the alumina coarse crystal particles. If electrofused alumina or high temperature calcined alumina such as those that calcine at temperatures above 1,700° C. are used for the alumina fine crystal particle portion, grinding ability is effected resulting in lower efficiency of operation and additionally, sintering of the abrasive grain is unsatisfactory, resulting in reduced mechanical strength of the sintered abrasive grain. On the other hand, when using fine alumina particles calcined at a lower temperature, such as Bayer alumina or the like and sintering is done at an elevated temperature, high crystal growth occurs with consequent reduced mechanical strength, increased wearing and lowered grinding capability.

The present invention resides in that the coarse particle portion (alumina coarse crystal particle) is occupied with electrofused or high temperature calcined alumina, and the space between the aforesaid coarse particles is filled with fine particles (alumina fine crystal particle), sintered integrally with the coarse particles, the latter being subjected to heat treatment at a temperature lower than that of the former, whereby a variety of characteristics required for the abrasive grains under heavy pressure loading is attained by way of controlling the particle size of both particle portions as well as quantity percentages of the same. The particle size is, as mentioned above. However, as to the quantity percentage, preferably the coarse particle portion is in the range of 15 to 60 weight %, preferably 20 to 50 weight %, while the fine particle portion is in the range of 85 to 40 weight %, preferably 80 to 50 weight %, as exemplified in the following examples.

As mentioned above, a small amount of inhibitor such as MgO, CaO, SiO2, NiO or the like may be added to the abrasive grains produced. This addition is applicable to one of the coarse and fine particle portion or to both. These additional inhibitors serve to improve of rigidity of the abrasive grains and inhibit crystal growth thereof, but excessive addition may cause reduced hardness. A small amount of inhibitor is preferred. Accordingly it is preferred to add 0.1 to 1.5 weight % of inhibitor.

The abrasive grains in accordance with the invention contain more than 99% alumina when no additional material is added. Even when inhibitor is added, they contain therein above 98% alumina. The grain size thereof is not particularly specified, but the range of 0.5 to 3.3 mm is preferable for heavy grinding operations. As mentioned above, the density and hardness of the abrasive grain are important characteristics, and the abrasive grain of the present invention is specified as having a density of more than 3.75 g/cm$^3$ and a hardness of more than 1,900 Kg/mm$^2$ so as to ensure a dense and tight structure. This type of abrasive grain is useful for heavy grinding operations, performed at grinding wheel pressing loads in the range of 20 to 300 Kg, but it may be applicable to extremely heavy grinding operations at higher grinding wheel pressing loads than that specified above, with a considerably lower grinding ratio (quantity of ground material/quantity of worn grinding wheel).

The reason why the abrasive grain of the invention is very useful for heavy grinding operations lies in the fact that the aforesaid grain structure has mechanical strength and rigidity sufficient to stand such heavy grinding and that generation of cutting edges of the abrasive grain takes place effectively. Cutting edge generation is due to chipping in the particle boundary between the coarse and fine particles, the former being more brittle and having more flaws, when resistance is increasingly developed between the worn grinding edge of the abrasive grain and the workpiece to be ground.

A preferred embodiment of the method for manufacturing the abrasive grains of the invention will now be described below.

First electrofused alumina coarse powder or high temperature calcined alumina coarse powder such as those that calcine at an elevated temperature (above 1,700° C.) is provided. Preferably the particle size of this coarse powder is in the range of 3 to 10 μm. It may be electrofused or calcined alumina coarse powder which is generated as by-product in the course of manufacturing conventional abrasive grains or refractory products.

Bayer alumina is suitable for the alumina fine crystal particles, and is well crushed so that almost all of the alumina particles is distributed in the fine particle size smaller than 1 μm. If an inhibitor such as MgO or the like is to be added it should be crushed to substantially the same particle size as that of the alumina powder prior to adding to and mixing with the alumina fine powder.

Next the components are well mixed, kneaded in the presence of water or if necessary, primary binder such as starch powder, and then subjected to a molding operation. Preferably the molding is performed with the aid of a vacuum-aided type extruder which allows the kneaded material to be extruded through a nozzle under reduced pressure. Preferably the inner diameter of the extruder is substantially equal to the outer diameter of the required abrasive grain. Thus a dense rod-shaped molded material is obtained. This molded material is naturally cut off in pieces during the course of falling out of the extruder nozzle or during travel through the drier, so that granular pieces are obtained, having a length which is almost equal to or a little longer than the diameter thereof. After completion of drying, the pieces are sintered in a rotary kiln or the like. It is preferable to use the rotary kiln because they are rotated during calcination, resulting in a more dense and rigid sintered product than if sintered in a static state.

Sintering temperature is an important factor, because it has a remarkable effect on the physical properties of the abrasive grain such as crystal size. To practice the method of the invention, it is required to inhibit crystal growth of the alumina fine crystal particle portion within a predetermined range. Accordingly sintering is not effected at an excessively high temperature, but it is to be noted that extremely low temperature sintering brings about decreased sintered strength, causing the mechanical strength of the abrasive grain to be reduced. Hence sintering should be effected above a predetermined temperature. Further sintering temperature differs, depending on the particle size of the alumina fine powder to be used. In case of alumina fine powder of which a major part of the particle (more than 95%) is distributed within the particle size smaller than 1 $\mu$m. sintering temperature is preferably in the range of 1,550° to 1,650° C., most preferably 1,580° to 1,620° C. An adequate time period required for sintering is in the range of 40 to 60 minutes at the highest temperaure zone. Since the alumina powder (coarse portion) is pretreated at a temperature higher than the above-described temperature, the alumina powder consists of single crystal particles. Accordingly, when it is subjected to sintering at the above-described temperatures no crystal growth is seen. In the meantime, crystal growth is seen in the fine particle portion. Since the crystal growth is limited to times under the aforesaid temperature conditions, the resultant particle size is maintained smaller than 2 $\mu$m, when using alumina particles smaller than 1 $\mu$m as the initial particle size.

EXAMPLE 1

In order to manufacture various kinds of abrasive grains, raw materials as listed in Table 1, below, are provided.

TABLE 1

| | |
|---|---|
| A | electrofused alumina 3 to 10 $\mu$m in particle size |
| A' | 3 to 10 $\mu$m in particle size 0.2 to 1 $\mu$m in particle size |
| B | Bayer alumina (calcined at 1,100° C.) 3 to 10 $\mu$m in particle size |
| B' | 3 to 10 $\mu$m in particle size 0.2 to 1 $\mu$m in particle size |
| C | Bayer alumina (calcined at 1,800° C.) 3 to 10 $\mu$m in particle size |
| C' | 3 to 10 $\mu$m in particle size 0.2 to 1 $\mu$m in particle size |

(The above listed C and C' represent raw material which are prepared by molding Bayer alumina to certain shape, calcining the molded material at 1,800° C. and crushing the calcined material)

Starting with the above listed raw material, the composite material in Table 2 is obtained.

TABLE 2

| | A | A' | B | B' | C | C' |
|---|---|---|---|---|---|---|
| 1 | 0 | | | 100 | | |
| 2 | 20 | | | 80 | | |
| 3 | 30 | | | 70 | | |
| 4 | 50 | | | 50 | | |
| 5 | 60 | | | 40 | | |
| 6 | 100 | | | 0 | | |
| 7 | | 60 | | | 40 | |
| 8 | 30 | | 70 | | | |
| 9 | | | | | 50 | 50 |
| 10 | | | 40 | 60 | | |

(in weight %)

The composite material is well kneaded in the presence of water and then is subjected to molding with a vacuum aided type extruder so as to form a rod-shaped molded material of 2.4 mm in diameter and 3 to 5 mm in length.

After completion of drying, the molded material is sintered in a rotary kiln in the temperature range of 1,500° to 1,600° C. and at the maximum temperature of 1,600° C. (temperature of sintered material) for 60 minutes. Table 3 shows the physical properties of the sintered products.

TABLE 3

| | density (g/cm$^3$) | particle size (in $\mu$)* coarse particle portion distribution (mean) | fine particle portion distribution (mean) | Knoop hardness (Kg/mm$^2$) | bending strength (Kg/mm$^2$) |
|---|---|---|---|---|---|
| 1 | 3.84 | — | 0.9–2.0(1.6) | 2086 | 63 |
| 2 | 3.86 | 3–10(5.6) | " | 2092 | 58 |
| 3 | 3.87 | " | " | 2131 | 58 |
| 4 | 3.80 | " | " | 2069 | 50 |
| 5 | 3.70 | " | " | 1964 | 44 |
| 6 | 3.51 | " | — | 1805 | 38 |
| 7 | 3.75 | 3–10(6.1) | 0.5–1.6(1.3) | 2017 | 46 |
| 8 | 3.77 | 3–10(5.6) | " | 2060 | 46 |
| 9 | 3.76 | 3–10(5.9) | 0.5–1.8(1.4) | 2032 | 51 |
| 10 | 3.70 | — | 0.5–2.0(1.5) | 1957 | 49 |

Note:
*The particle size was measured on the surface of the abrasive grain appeared by hot etching.

To make a performance comparison, grinding wheels were made of the above-listed abrasive grains and conventional abrasive grains, in the manner known per se, using phenol resin as a binder. Continuous grinding tests were conducted on spring steel (SUP-6 according to JIS) as the workpiece to be ground at a peripheral speed of 2,700 m/min. under a load of 45 Kg for 10 minutes.

The results of the tests are shown in Table 4 below. In the table the grinding ratio represents the quantity of ground material/quantity of worn grinding wheel.

TABLE 4

| grinding wheel No. | quantity of ground material (g) | quantity of worn grinding wheel (g) | grinding ratio | recognition of dulled grinding wheel |
|---|---|---|---|---|
| 1 | 2562 | 375 | 6.8 | yes |
| 2 | 3412 | 443 | 7.8 | no |
| 3 | 3565 | 495 | 7.2 | no |
| 4 | 3219 | 494 | 6.3 | no |
| 5 | 2944 | 581 | 5.1 | no |
| 6 | 1503 | 427 | 3.6 | yes |
| 7 | 2067 | 455 | 4.6 | no |
| 8 | 2535 | 420 | 6.0 | no |
| 9 | 2470 | 449 | 5.5 | no |
| 10 | 2118 | 450 | 4.7 | yes |
| 11 | 1626 | 416 | 3.9 | yes |
| 12 | 3256 | 501 | 6.5 | no |
| 13 | 2641 | 843 | 3.1 | yes |

Noted that the wheel No. 11 denotes bauxite sintered abrasive grains, the wheel No. 12 denotes alumina-zirconia abrasive grains (ZrO$_2$ 25%) and the wheel No. 13 is of electrofushed alumina abrasive grains. In the Table 4 the dulled grinding wheel is identified by its reduced grinding speed which can be read by means of electric power meter. This indicates a dressing operation is required to restore the original grinding speed.

EXAMPLE 2

The wheel No. 3 which is regarded as showing the most desirable result in Example 1 was examined particularly with respect to the effect of sintering temperature on abrasive grain. Tests were conducted under the same conditions as in Example 1 including the test conditions of the grinding wheel except that the sintering temperature in a rotary kiln is different. The test results are shown by way of characteristics of the grinding wheel in Table 5 and by way of the performance capability of the grinding wheel in Table 6.

TABLE 5

| grinding wheel No. | sintering temperature (°C.) | density (g/cm³) | particle size (μ) coarse particle portion distribution (mean) | particle size (μ) fine particle portion distribution (mean) | hardness (Kg/mm²) | bending strength (Kg/mm²) |
| --- | --- | --- | --- | --- | --- | --- |
| 14 | 1500 | 3.62 | 3–10(5.6) | 0.6–1.4(1.0) | 1680 | 31 |
| 15 | 1550 | 3.75 | " | 0.6–1.7(1.2) | 2010 | 48 |
| 16 | 1600 | 3.87 | " | 0.7–1.9(1.3) | 2151 | 57 |
| 17 | 1650 | 3.87 | " | 0.9–2.1(1.6) | 2160 | 54 |
| 18 | 1700 | 3.88 | " | 2.4–4.5(3.2) | 2175 | 46 |
| 19 | 1800 | 3.90 | 10–25(15) | 10–25(15) | 2194 | 42 |

TABLE 6

| grinding wheel No. | quantity of ground material | quantity of worn grinding wheel | grinding ratio | recognition of dulled grinding wheel during operation |
| --- | --- | --- | --- | --- |
| 14 | 1537 | 418 | 3.7 | yes |
| 15 | 2802 | 452 | 6.2 | no |
| 16 | 3695 | 507 | 7.3 | no |
| 17 | 3599 | 576 | 6.2 | no |
| 18 | 3405 | 629 | 5.4 | no |
| 19 | 2614 | 805 | 3.2 | yes |

As mentioned above, the abrasive grains and the method for manufacturing the same in accordance with the invention have been disclosed with reference to the accompanying drawing and reference tables. It should of course be understood that they are only illustrative for easy understanding of the invention and that it may be changed and modified without any departure from the spirit and scope of the invention.

What is claimed is:

1. Alumina abrasive grains produced by sintering, having a density of more than 3.75 g/cm³, a hardness (Knoop) of higher than 1,900 Kg/mm², and a purity of higher than 98 percent wherein the grain structure is constructed of alumina coarse crystal particles of sizes in the range of 3 to 10 μm, and alumina fine crystal particles of sizes smaller than 2 μm, and said fine crystal particles are interposed among said coarse crystal particles.

2. A method for manufacturing abrasive grains, which comprises; forming alumina coarse powder with a purity of higher than 98% and with a particle size in the range of 3 to 10 μm by electrofusing or calcining at a temperature of higher than 1700° C.; forming alumina fine powder with a purity of higher than 98% and with a particle size of smaller than 1 μm by calcining at a temperature of lower than 1700° C.; kneading said alumina coarse powder and said alumina fine powder in the presence of water or if necessary, primary binder; extruding the kneaded material by means of a mechanical extruder; drying the extruded material; cutting the extruded material to a predetermined length; and sintering the dried and cut pieces of extruded material at a temperature higher than that of calcining the fine powder and lower than 1700° C.

3. A method as set forth in claim 2, wherein said primary binder to be added during kneading is starch.

4. A method as set forth in claim 2, wherein extruding is performed under reduced pressure with the use of a vacuum aided type extruder.

5. A method as set forth in claim 4, wherein the kneaded material is extruded through a nozzle during the extruding operation, the nozzle having an inner diameter substantially equal to the outer diameter of the abrasive grain.

6. A method as set forth in claim 4, wherein the extruded material is cut to the predetermined length naturally or with the aid of suitable cutting means, said length being substantially equal to or a little longer than the diameter of the product abrasive grain.

7. A method as set forth in claim 2, wherein the grannular pieces of the molded material are sintered in a rotary kiln.

8. A method as set forth in claim 7, wherein the granular pieces of the molded material are sintered in a temperature range of 1,550° to 1,650° C., for 40 to 60 minutes.

* * * * *